Sept. 11, 1928.  H. E. ALTGELT  1,684,211
PLANTER
Filed Oct. 2, 1925    4 Sheets-Sheet 2
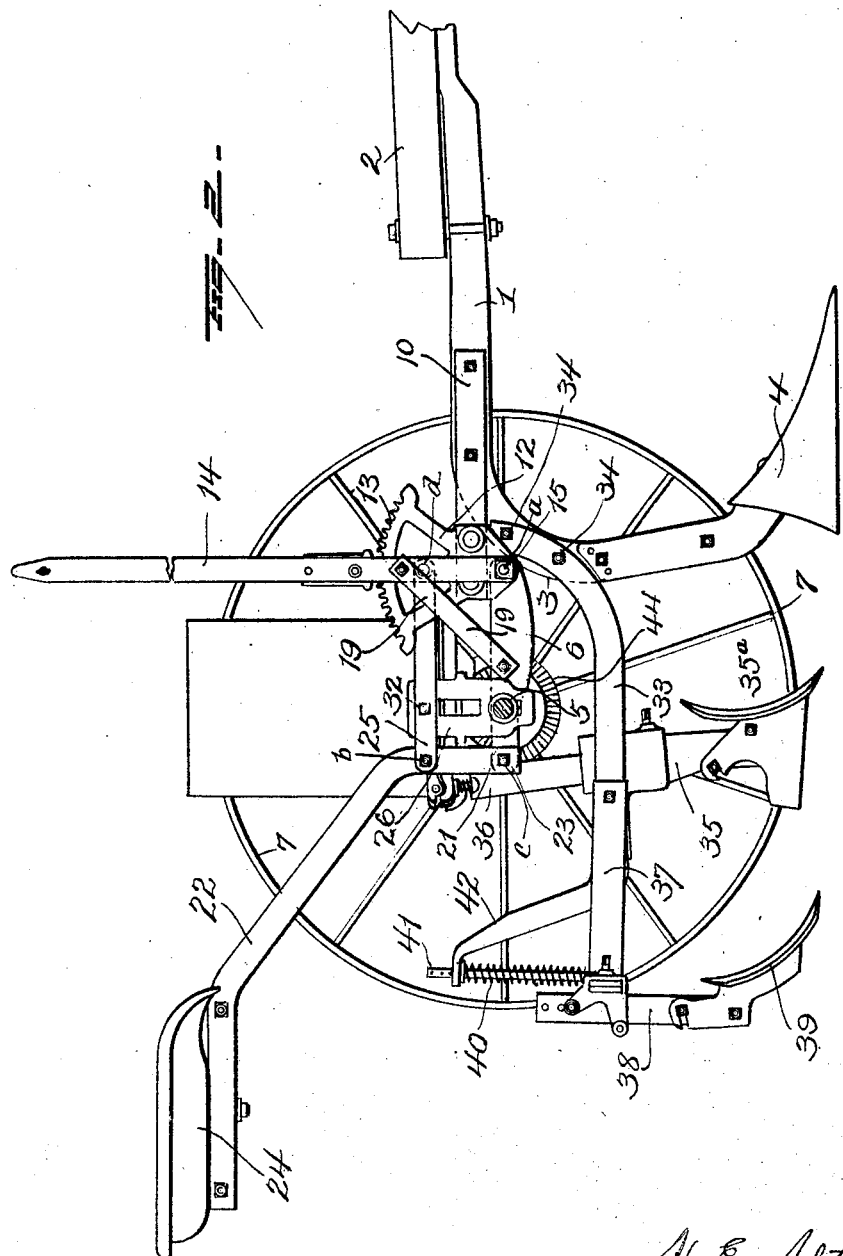

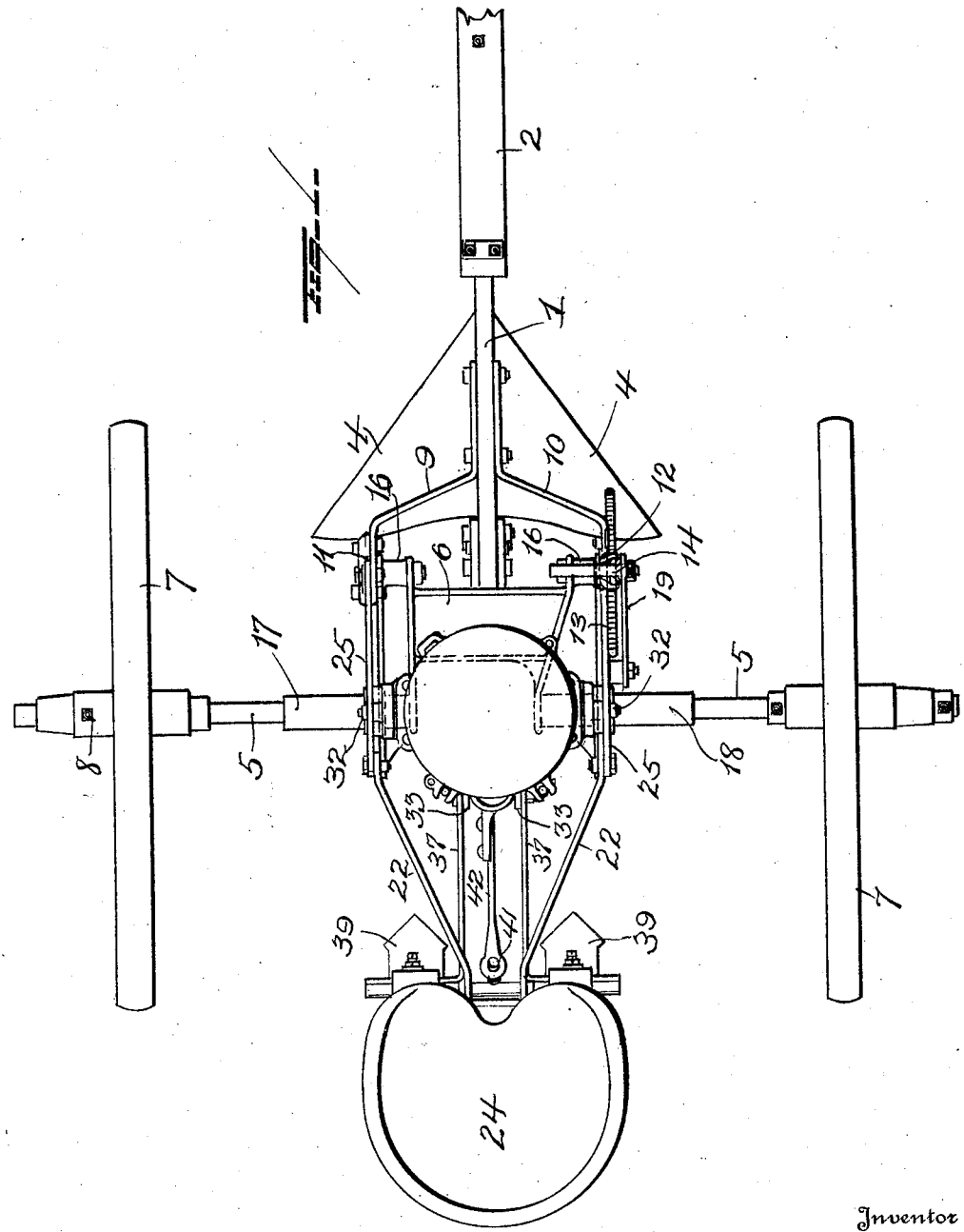

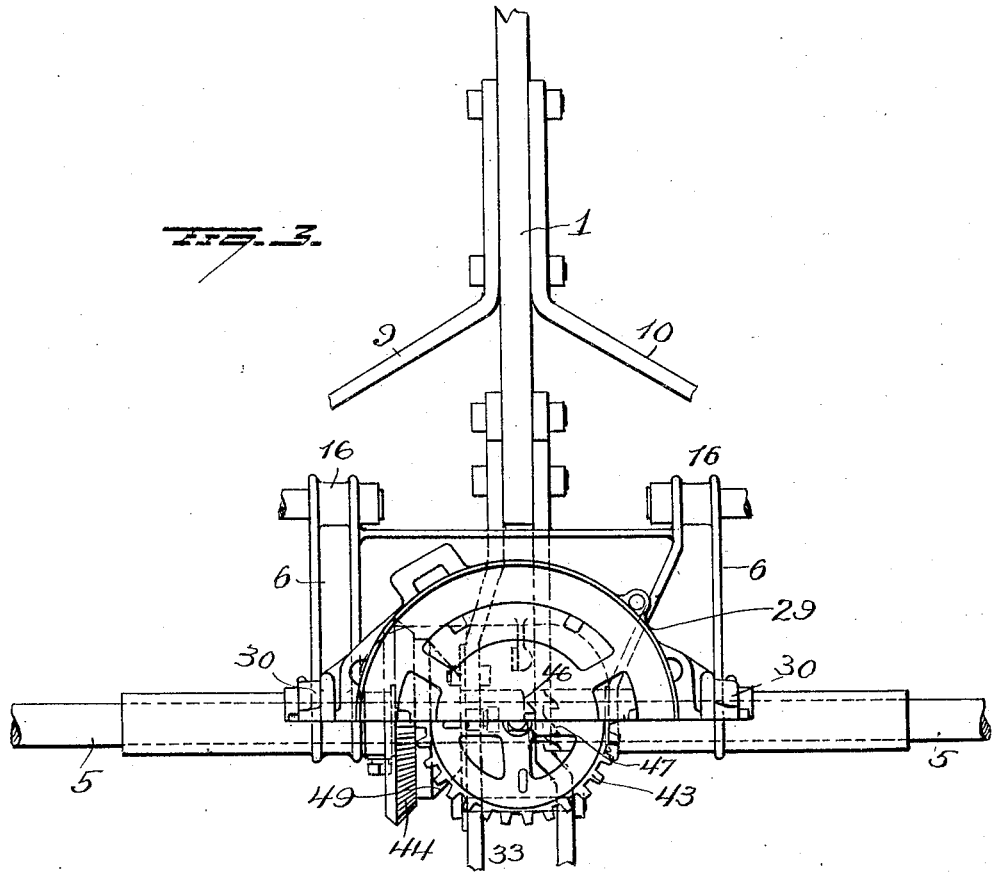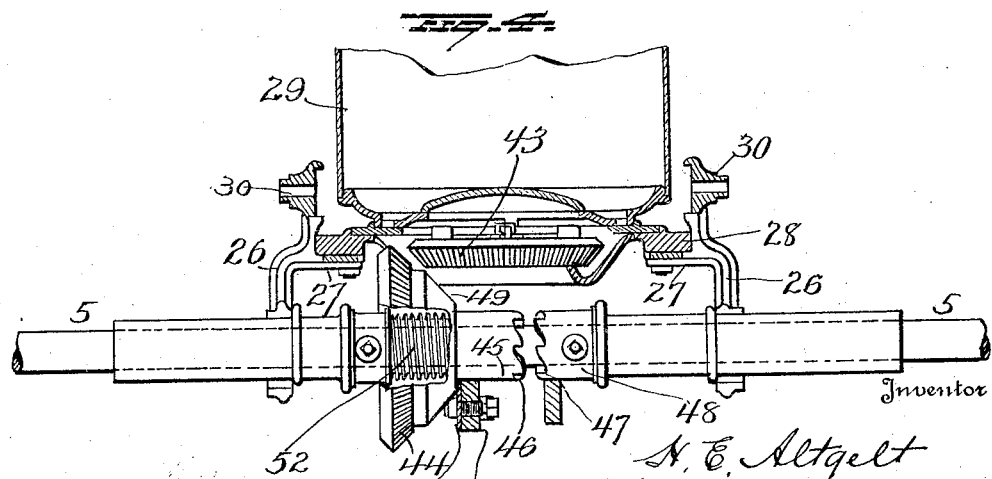

Sept. 11, 1928.                H. E. ALTGELT                1,684,211
                                  PLANTER
                          Filed Oct. 2, 1925         4 Sheets-Sheet 4
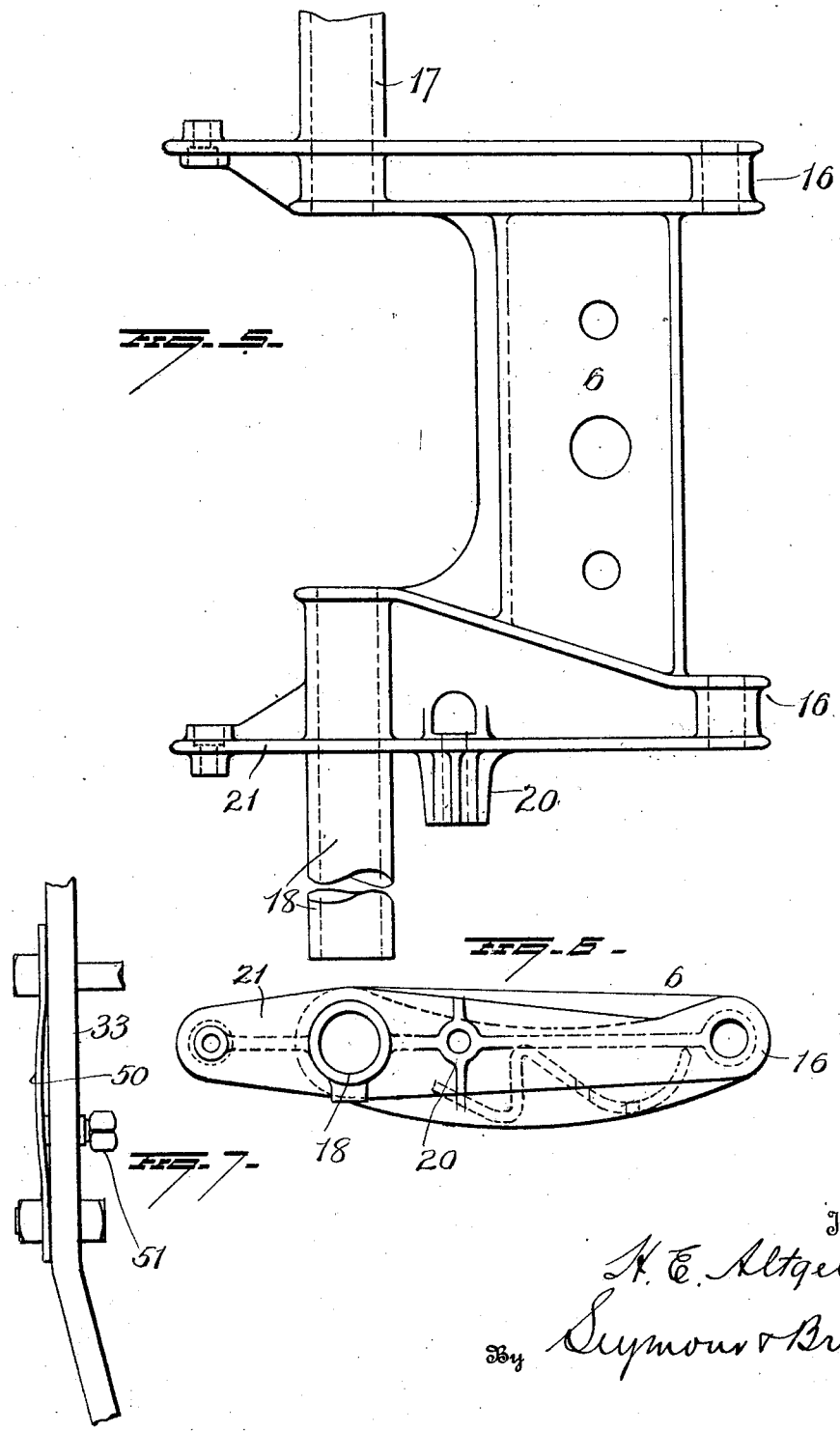

Patented Sept. 11, 1928.

1,684,211

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

PLANTER.

Application filed October 2, 1925. Serial No. 60,058.

This invention relates to improvements in planters for corn or cotton,—one object of the invention being to so construct a planter that the various earth engaging devices shall be carried by a beam rigidly secured to the pole, and to provide simple and efficient means to effect the raising or lowering of such earth engaging devices.

A further object is to provide a planter in which the beam carrying the furrow opener has connection with the pole and in which the seed boot and covering devices are carried by said beam, and to associate with such structure, means for effecting the raising or lowering and adjustment for depth of penetration by raising or lowering said beam and the devices carried thereby without disturbing the annular relation of the seed can and seat to said beam.

A further object is to so construct a planter that the seed can shall be supported directly over the axle and so that the gearing of the seed feeding means shall be rendered inoperative automatically when the beam carrying the earth engaging devices is raised; so that the operative relation of said gearing shall be established automatically when said beam is lowered, and so that the feed can shall be maintained in the same angular relation to the beam during all vertical movements or adjustments of the latter.

With these and other objects in view, the invention consists in certain novel features of construction and combinations of parts as hereinafter set forth and pointed out in the claims.

In the accompanying drawings,—

Figure 1 is a plan view of a planter showing an embodiment of my invention.

Figure 2 is a side elevation partly in section.

Figure 3 is an enlarged partial plan view with the seed can body removed.

Figure 4 is an enlarged sectional view partly in elevation showing the seed can mountings and gearing for the feeding means.

Figure 5 is a separate view of the link casting.

Figure 6 is a view in side elevation of the link casting, and

Figure 7 is a view of a detail.

In the embodiment of my invention shown in the drawings, a beam 1 is rigidly bolted to a pole 2, the forward end of the latter being movably attachable to the neck yokes of the draft animals, and the rear portion of the beam 1 is constructed to provide a standard 3 for a furrow opener 4. An axle 5 is located rearwardly of the beam 1 and is flexibly connected therewith through the medium of a casting or member 6 which constitutes, in effect, a link between said beam and axle, as will be hereinafter more particularly described. Ground wheels 7 are located at the ends of the axle 5 and one of these ground wheels is securely bolted to said axle as indicated at 8.

The forward portions of arms 9—10 are securely bolted to the beam 1 and extend therefrom laterally and rearwardly. To the rear end portions of these arms (which end portions are parallel with each other), brackets 11—12 are secured. These brackets are similar in construction, except that the bracket 12 is provided with a toothed segment 13 for the accommodation of a suitable detent on a hand lever 14, the latter having connection at 15 with the lower portion of said bracket 12. The forward end of the link casting 6 is provided with perforated bosses 16 for the accommodation of shoulder bolts which pivotally connect the forward end of said link casting with the brackets 11 and 12. The rear portions of said link casting are made with sleeves 17—18 mounted freely upon the axle 5. A link 19 is connected at one end with the hand lever 14 and at its other end with a boss 20 projecting laterally from the link casting 6 for the purpose of maintaining said lever always in the same angular relation to the link casting. The link casting 6 is provided with rearwardly projecting arms 21 with which the lower ends of seat bars 22 are pivotally connected as indicated at 23,—the rear ends of said bars 22 supporting a seat 24 secured thereto in any suitable manner. To the vertical portions of the seat bars, links 25 are pivotally connected and the forward ends of these links are pivotally connected with the brackets 11—12.

Can supports 26 are freely mounted near their lower ends upon the sleeves 17—18 of the link casting 6 and these supports are provided with inwardly projecting arms 27 upon which the can bottom casting 28 is mounted and secured as shown in Figure 4, the can 29 being suitably supported over said bottom casting 28 and thus the can is supported directly over and by the axle through the medium of the link casting mounted on said axle. The can supports 26 are provided at their upper ends with bosses or enlargements 30 with which the links 25 are connected as at 32, as shown in Figures 1 and 2.

Bars 33 are secured at their forward end portions to the beam 1 (or standard portion thereof) by means of bolts 34. The bars 33 extend in an approximately horizontal direction under the axle and have secured thereto a seed spout 35 (carrying a soil engaging member 35$^a$) with which a boot or conveyor 36 communicates. Pivoted links 37 extend rearwardly from the bars 33 and boot 35 and at their rear ends, carry the standards 38 of coverers 39. These coverers are normally pressed by means of a spring 40 disposed on a rod 41 which passes through an upwardly projecting fixed arm 42.

If the lever 14 be moved forwardly when the forward end of the pole is connected with the neck yokes of the draft animals, the pivot point $a$ will be lowered and with it the furrow opener or sweep 4 as well as the seed spout 35 and the seed covering members 39,—said seed spout and covering members being suspended from the bars 33 which are fastened rigidly to the beam 1. When the lever 14 is pulled rearwardly the pivot point $a$ will be raised and with it the furrow opener 4, the spout 35 and the seed covering members 39.

The planter is so constructed that a line from the point $a$ to the point $c$ will always be parallel with a line from $b$ to $d$ and that a line $b$ to $c$ will always be parallel with a line from $d$ to $a$. The result is that on account of this parallelogram, whether the planter is in a raised or lowered position, the seed can and the seed can bottom will always remain at the same angle to the beam 1 and the seat bars and seat will always remain at the same angle to said beam 1.

A beveled gear 43 is provided for the seed feeding means and motion is transmitted to this gear from a vertically disposed beveled gear 44 carried by a clutch sleeve 45 mounted freely on the axle 5. One end of this sleeve is made with clutch teeth 46 for cooperation with similar teeth 47 on a clutch collar 48 secured to the axle. The vertically disposed gear 44 is made with a hub having a conical portion 49 and to the side of one of the bars 33, a plate 50 is secured. This plate is preferably made of steel and is so connected with the bar 33 that it may be bulged as shown in Figure 7, by means of a set screw 51. When the lever 14 is moved rearwardly to practically the full extent of the toothed segment 13 and the bars 33 carried by the beam 1 are raised to the upper limit of their movement, the steel plate 50 on one of said bars 33 will engage the conical portion 49 of the hub of gear 44 and move the latter out of mesh with the horizontal gear 43 of the feed mechanism. When the lever 14 is moved forwardly to lower the beam 1 and the devices carried thereby, the plate 50 will descend with the bar 33 to which it is secured and the vertical gear 44 will be thus freed to be forced into mesh with the gear 43 by the action of a spring 52. At the same time the clutch teeth 46—47 (which had been previously separated by the movement of the gear 44 away from the gear 43) will be brought into mesh. Thus it will be seen that when the beam 1 and the devices carried thereby are raised, the feed operating means will be thrown out of action and that when said beam and devices carried thereby are lowered, the feed operating means will be brought into operative relation to each other. The feed operating means are therefore thrown out of and into operative relation automatically upon the raising or lowering of the planting devices carried by the beam 1.

Having fully described my invention what I claim as new and desire to secure by Letters-Patent, is:

1. In a planter, the combination with a wheeled axle, a beam, a connection between the wheeled axle and beam, a furrow opener carried by said beam, bars secured to and extending rearwardly therefrom, a seed spout or boot and coverers carried by said bars, means for raising and lowering said beam and the devices carried thereby, a seed can, a horizontal gear for the feed mechanism of said seed can, a vertical gear mounted on the axle and slidable thereon, said vertical gear having a beveled portion, an adjustable plate carried by one of said bars for cooperation with the beveled portion of the vertical gear to move the latter out of mesh with the horizontal gear when the beam and the devices carried thereby are raised, and means for moving the vertical gear into mesh with the horizontal gear when the beam and said bars together with the devices carried thereby are lowered.

2. In a planter, the combination of a wheeled axle, a beam in advance of the axle, a flexible connection between the axle and the beam, a series of earth-engaging devices carried by the beam, some of said devices operating in advance of the axle and some in rear of the axle, and a seed can carried by said flexible connection and disposed over the axle.

3. In a planter, the combination of a wheeled axle, a beam in advance of the axle, a flexible connection between the beam and the axle consisting of a single member pivoted at its front end to the beam and at its rear end upon the axle, a seed can carried by said flexible connection, earth-engaging devices carried by the beam, a lever fulcrumed on the front pivot of the flexible connection, and a connection between the lever and the flexible connection whereby the angular relation of the lever to the flexible connection is kept constant.

4. In a planter, the combination of a wheeled axle, a beam in advance of the axle, a member pivotally connected at its front end to the beam and at its rear end upon the axle to constitute a flexible connection between the axle and the beam, earth-engaging devices carried by the beam, a seed can carried by said flexible connection, a lever connected with the flexible connection and fulcrumed at the front pivot thereof for raising and lowering the beam, and connections between the lever, the flexible connection and the can to maintain a constant angular relation between the can and the beam.

5. In a planter, the combination of a wheeled axle, a beam in advance of the axle, a member flexibly connecting the beam and the axle, earth-engaging devices carried by the beam, a seed can carried by said member over the axle, means for raising and lowering the beam, and elements forming with said member parallelograms connected with the seed can whereby to maintain a constant angular relation between the seed can and the beam.

6. In a planter, the combination of a wheeled axle, a beam in advance of the axle, earth-engaging devices carried by the beam, a member loosely connected with beam and the axle and constituting a flexible connection between them, a seed can carried by said member, a lever pivotally supported by the beam and connected with said member whereby to rock the member and raise and lower the beam, elements connected with the seed can and forming parallelograms with the lever and said member whereby to maintain a constant angular relation between the seed can and the beam, and a pole rigidly secured to the beam.

7. In a planter, the combination of a wheeled axle, a beam in advance of the axle, earth-engaging devices carried by the beam, brackets carried by the beam, a link casting pivotally connected with said brackets and with the axle, said casting constituting a flexible connection between the beam and the axle, a seed can, can supports intermediate the link casting and the can, seat bars connected with the link casting, links connecting the seat bars with said brackets, connections between said links and the can supports, a lever pivotally supported by the beam, and a connection between the lever and the link casting.

8. In a planter, the combination of a wheeled axle, a beam in advance of the axle, a furrow-opener carried by the beam, bars secured rigidly to and projecting rearwardly from the beam, a seed spout and coverers carried by said bars, a flexible connection between the beam and the axle, a seed can carried by the flexible connection over the axle, a lever pivotally supported by the beam coincident with the flexible connection, a connection between the flexible connection and the lever, and connections between the seed can and the flexible connection whereby to maintain a constant angular relation between the can and the beam.

9. In a planter, the combination of a wheeled axle, a beam in advance of the axle, a flexible connection between the beam and the axle, a furrow-opener carried by the beam, bars secured rigidly to and projecting rearwardly from the beam, a boot and coverers carried by said bars, a seed can supported over the axle by the flexible connection, a horizontal gear for feed mechanism at the bottom of the can, a vertical gear mounted on the axle and having a tapered hub, a clutch to connect the vertical gear to the axle, a spring tending to close the clutch and hold the gears in mesh, means on one of the bars to engage the tapered hub of the vertical gear and open the clutch and unmesh the gears when the beam and said bars are raised, and means for raising and lowering the beam and the bars and maintaining a constant angular relation between the beam and the seed can.

10. In a planter, the combination of a wheeled axle, a beam in advance of the axle, soil-engaging devices carried by the beam, a flexible connection between the axle and the beam, a seed can supported over the axle by said flexible connection, gearing between the axle and the feed mechanism of the seed can, means connected with the soil-engaging devices for throwing the gearing out of mesh when said devices are raised, and means connected with the flexible connection for raising and lowering the beam and the soil-engaging devices.

In testimony whereof, I have signed this specification.

HERMAN E. ALTGELT.